Oct. 25, 1955  R. L. OLIN  2,721,967
ELECTRIC MOTOR FOLLOW-UP SYSTEM
Filed April 17, 1953
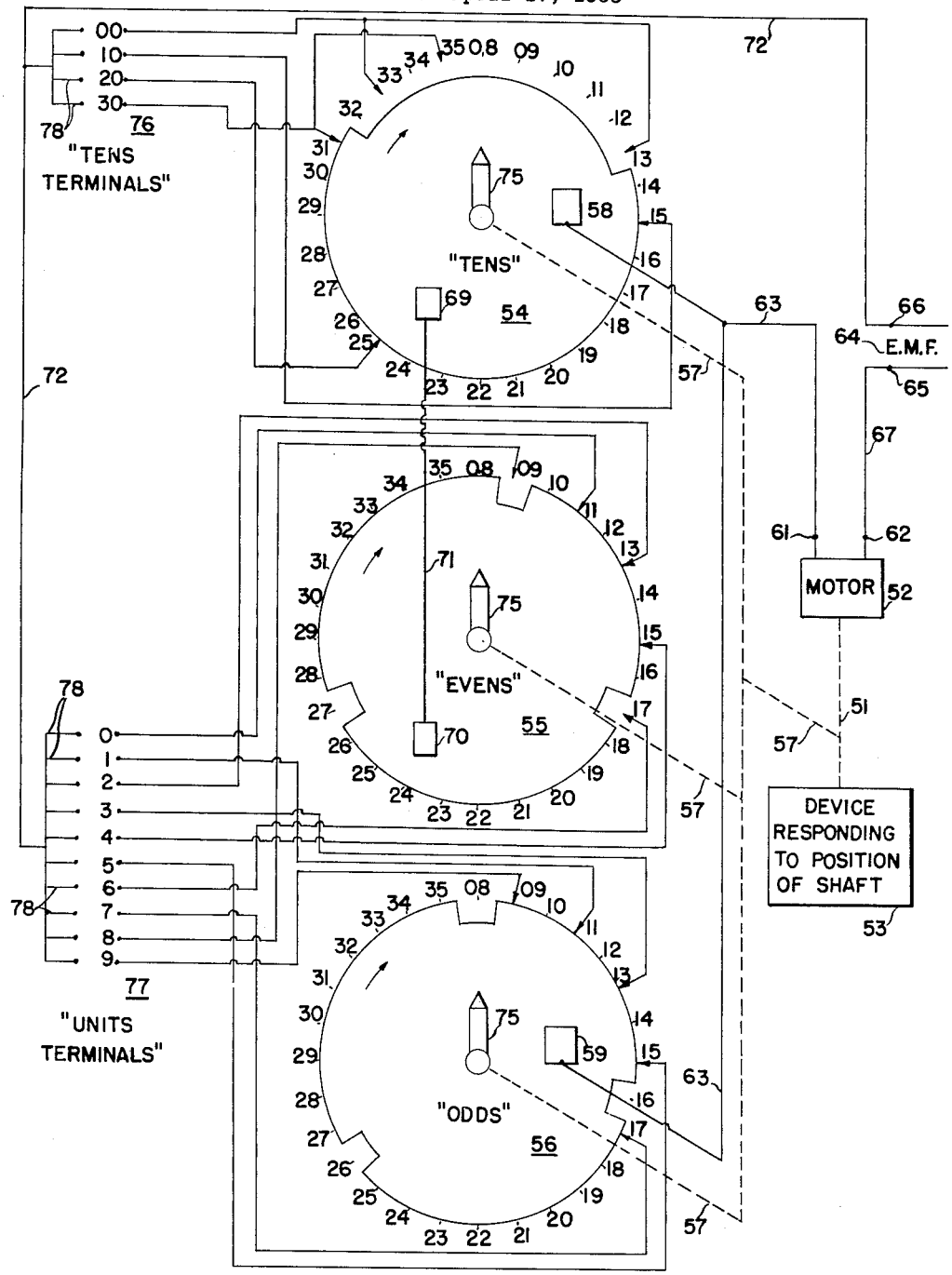
INVENTOR.
ROBERT L. OLIN
BY George H Fisher
ATTORNEY United States Patent Office 2,721,967
Patented Oct. 25, 1955

2,721,967
ELECTRIC MOTOR FOLLOW-UP SYSTEM
Robert L. Olin, New Brighton, Minn., assignor to Minneapolis-Honeywell Regulator Company, Minneapolis, Minn., a corporation of Delaware
Application April 17, 1953, Serial No. 349,438
5 Claims. (Cl. 318—33)

This invention pertains to apparatus for rotating a shaft to a predetermined angular position. Specifically, the invention is directed toward a method of controlling the energization of a motor that moves the shaft to the predetermined position, the motor at this point becoming de-energized and the shaft remaining in said predetermined position until a new positioning of the shaft is desired.

In the copending application of Kimball C. Cummings, Serial Number 349,500, filed April 17, 1953, and assigned to the same assignee as the subject application, a system of shaft positioning is shown and described.

The subject invention is an improvement over said Cummings application, above identified, and comprises a system wherein the shaft is adapted to be rotated to a plurality of angular positions serially identified by successive whole numbers having two figures. The system comprises, in addition to the shaft, a motor adapted when energized to rotate the shaft, shaft position determining means comprising a plurality of tens terminals, a plurality of units terminals, a plurality of electrically conductive members mounted for rotation unitarily with said shaft, said members having not more than one peripheral notch for each successive group of ten and any fraction of a group of ten of said successive whole numbers, contacting means positioned peripherally about said members for normally electrically engaging said members and for electrically disengaging said members when said notches oppose said contacting means; terminal means adapted to be energized by an electromotive force; and means including additional connection means for energizing said motor from said last named terminal means through said contacting means, said members, and through a selected one of said tens terminals and through a selected one of said units terminals so that said motor is energized and rotates a shaft until the contacting means connected with said one of said tens terminals and said one of said units terminals are electrically disengaging said members.

The principal object of this invention is to provide an improvement over prior methods of shaft positioning, the improvement comprising a great simplification in the over-all design of the apparatus.

For a full understanding of the invention, its objectives, and for a further appreciation of its features and advantages, reference may now be had to the following detailed description and accompanying drawing, and to the appended claims.

The drawing is a schematic representation of one embodiment of the invention.

Referring to the drawing, a shaft 51 is adapted to be rotated to 28 angular positions numbered consecutively from 08 to 35 by a motor 52. A device 53 which responds to the position of shaft 51 is operatively connected to the shaft. The device 53 could have many embodiments, one example being the mechanism for tuning a piece of radio apparatus in one megacycle steps from a minimum frequency of 108 megacycles to a maximum frequency of 135 megacycles. A plurality of electrically conductive discs 54, 55, and 56 are operatively connected to shaft 51, this being indicated by dashed lines 57. The conductive discs 54 and 56 have wipers or contacts 58 and 59 respectively continuously in engagement therewith, the wipers 58 and 59 being connected to a first terminal 61 of motor 52 by means of connecting lead 63. A second terminal 62 of motor 52 is connected to a first terminal 65 of a source of electromotive force 64 by means of a connecting lead 67. The conductive discs 54 and 55 are maintained at the same electrical potential by a pair of wipers 69 and 70 respectively associated therewith and interconnected by lead 71.

Positioned about the peripheries of the discs 54, 55, and 56 are a plurality of stationary contacts or wipers. The wipers associated with disc 54 are electrically connected by leads to a group of terminals 76 also identified as the "tens terminals." The wipers associated with discs 55 and 56 are electrically connected by leads to a group of terminals 77 also identified as the "units terminals." Each of the "tens terminals" and the "units terminals" is opposed by a complementary terminal 78. The complementary terminals 78 are all at the same electrical potential and are all connected by means of a lead 72 to the second terminal 66 of the source of electromotive force 64.

The motor 52 is preferably a rotary solenoid or ratchet type motor wherein unidirectional impulses of rotation or motion of its output shaft are obtained rather than continuous motion or rotation. In other words, the operation of motor 52 is such that it will advance shaft 51 one position at a time. Motor 52 rotates shaft 51 such that discs 54 to 56 turn clockwise as shown in the drawing. Many motors commercially available to perform this function are known to those skilled in the art.

The particular embodiment of the invention shown is a system of apparatus for positioning shaft 51 to any one of twenty-eight positions numbered consecutively from 08 to 35. It will be noted that this particular selection of identifying digits causes the entire sequence of numbers to fall into four groups of numbers, each having a same first figure. To explain, the first group includes 08 and 09, the second group includes numbers 10 to 19, the third group includes numbers 20 to 29, and the fourth group includes numbers 30 to 35. Since four groups of numbers having the same first figure are included in the digits identifying the desired sequence of numbers, it is necessary to have four "tens" terminals, one for each group. Further, since there are ten digits in the largest of the groups, it is necessary to have ten "units" terminals, ranging from 0 through 9. The "tens terminals" are identified as the "00" "tens" terminal which includes the numbers 08 and 09, the "10" "tens" terminal which includes numbers from 10 through 19, the "20" "tens" terminal which includes numbers from 21 through 29, and the "30" "tens" terminal which includes numbers from 30 through 35.

Referring now to discs 54, 55, and 56, pointers 75 are shown, their purpose being to give a visual indication of the angular position of the discs. Since all of the discs turn unitarily with the shaft 51, it follows that when the pointer 75 of one disc points to a certain number, the pointers 75 of the other discs will also point to that position. The disc 54 has a notch or slot occupying a large portion of its periphery. For optimum results, and as is shown in the drawing, the preferred embodiment, the notch in disc 54 should span the same number of positions as are in the largest group of numbers having the same first figure. To explain, there are two full groups of ten numbers, all having the same first figure. These are the numbers from 10 to 19 and the numbers from 20 to 29. Therefore, it is preferred that the notch on disc 54 extend along the periphery of disc 54 a distance sufficient to span ten of the twenty-eight positions. The function of disc 54 is to position the shaft 51 to the first numbered position of a group of numbered positions having the same first figure, the group of numbered positions including a pre-selected numbered position. For example, if it were desired to position shaft 51 to position 27, then position 27 would be the pre-selected numbered position and disc 54 would function to position shaft 51 to the first numbered position (20) of a group of numbered positions (20–29) having the same figure (2), the group of numbered positions (20–29) including the pre-selected numbered position (27). In other words, the disc 54 provides the means of bringing shaft 51 to positions 08, 10, 20, and 30. The wipers positioned about disc 54 are set out in the following manner. First, it is to be assumed that the disc has a notch therein and the pointer 75, i. e., shaft 51 is at position 08. Now, when the pointer is at the beginning of the control sequence, a wiper is placed at the position which is nearest to the leading edge of the disc and which does not establish electrical contact therewith. In the example where the sequence of numbers under consideration are those associated with the "00" terminal or in other words the 08 and the 09 positions, the shaft is placed in position 08 and a wiper is positioned at position 13, this being the position closest to the leading edge of the notch or disc 54 without actually establishing electrical continuity therewth. If the number of numbered positions in the sequence to be controlled is equal to the total number of spaces in the notch, then it is not necessary to have any additional wipers to control the sequence. If, however, the number of numbered positions in the sequence to be controlled is less than the total number of positions spanned by the notch, it is necessary to put in an additional wiper for the correct operation of the system. In the case of the sequence under consideration, i. e., 08, 09, there are only two positions to be controlled. There are ten positions spanned by the notch, and the difference between the positions spanned by the notch and the numbers to be controlled is the difference between ten and two or eight. Then, beginning at the position of the first wiper (position 13) and counting eight positions against the direction of rotation of the discs (counterclockwise) eight spaces are covered bringing one to position 33 at which point the second wiper or contact is positioned. Both the wipers at 13 and 33 are then electrically connected to the "00" "tens" terminal. In the case of the group of numbers from 10 through 19 and in the group of numbers from 20 through 29, it is necessary to have only one wiper for each group of numbers. To explain, when disc 54, i. e., shaft 51 is on position 10, or two positions advanced from the position shown on Figure 1, the position 15 is the position closest to the leading edge of the notch and hence the control wiper for the "10" "tens" terminal will be positioned there. When shaft 51 is on position 20, position 25 is closest to the leading edge of the notch and consequently the control wiper for the "20" "tens" terminal is positioned at that position. For the group of numbers from 30 through 35, the first control wiper position is determined by having shaft 51 at position 30 and determining that position 35 is closest to the leading edge of the notch but not in electrical contact with the disc. Therefore, the "30" terminal is connected to a wiper at position 35. However, since the group of numbers being controlled is less than the total number of positions spanned by the notch, it is necessary to provide an additional wiper. As in the case of the group of numbers in the "00" range, the position of the additional wiper is calculated by subtracting the number of numbered positions in the control sequence from the total number of positions spanned by the notch and counting in a direction opposite to the direction of rotation of disc 59 (counterclockwise) a distance equal to the difference. In other words, the number of numbered positions being controlled is six, that is, 30, 31, 32, 33, 34, and 35. The number of positions spanned by the notch is ten and the difference between ten and six is four. Therefore, four spaces are counted counterclockwise from point 35 which brings one to point 31, at which point the second wiper is placed. This wiper at position 31 is also connected to the "30" terminal. By following the above outlined procedure and positioning of the wipers about disc 54, a disc and wipers may be designed for any sequence of numbers.

As pointed out above, the disc 54 serves the purpose of positioning shaft 51 to the first numbered position of a group of numbered positions having the same first figure, the group of numbers including a pre-selected numbered position. To explain, if position 26 were desired, means which are not shown would complete an electrical circuit between the "20" terminal in the "tens terminal" group and its complementary terminal 78. The exact details of the means by which this establishing of continuity between the "20" terminal and its complementary terminal 78 are not important here and will therefore not be described. However, when electrical continuity is established between the "20" terminal and its complementary terminal 78 an electrical circuit energizing motor 52 will be established. Current will flow from terminal 66 of the source of electromotive force 64 through lead 72, the complementary terminal 78 of the "20" terminal, the "20" terminal, the wiper positioned at position 25, disc 54, wiper 58, connection lead 63, motor 52 and back to the other terminal 65 of the source of electromotive force 64 by connection lead 67. Motor 52, being energized, will commence to cause shaft 51 to rotate step by step turning discs 54, 55, and 56 clockwise. The motor will continue to be energized by virtue of the "20" terminal until wiper 25 no longer is in electrical engagement with the disc 54. This point, of course, is when shaft 51 is at position 20. Similarly, if position 34 were called for, the "30" terminal would be connected to its complementary terminal 78 and the wipers at positions 31 and 35 would be effectively connected to terminal 66 of the source of electromotive force 64 and consequently current would flow into disc 54 from terminal 31 and/or terminal 35 (depending upon the position of shaft 51) until shaft 51 was in position 30.

Discs 55 and 56 provide the function of positioning shaft 51 to the exact angular position called for. This is accomplished by a unique arrangement of wipers or contacts positioned about the peripheries of these discs and in the positioning of a plurality of notches on the peripheries of each of these discs. Discs 55 and 56 are respectively identified as the "evens" and the "odds" discs. A total of five wipers or contacts are positioned about each of discs 55 and 56. In the case of disc 55, wipers are positioned at points 09, 11, 13, 15, and 17 and are respectively connected to the "8," "0," "2," "4," and "6" terminals of the "units terminals" group 77. Wipers are correspondingly placed about disc 56 and are respectively connected to the "9," "1," "3," "5," and "7" terminals of the "units terminals" group 77. For the correct operation of the system, it is necessary that notches be positioned about the peripheries of the discs 55 and 56 so that for each position of shaft 51 there will be a wiper opposed by a notch. It is with this thought in mind, that the notches about the peripheries of the discs 55 and 56 may be laid out. In the case of disc 55, when shaft 51 is on position 08 it is desired that the wiper associated with the "8" terminal of the "units terminal" group be opposed by a notch on disc 55. It is noted that the "8" terminal of the units terminals group is connected to the wiper at position 09. Therefore, a notch is cut in disc 55 at this point. When shaft 51 has advanced 10 spaces from the position shown in the drawing, or has advanced to position 18, it is again necessary that wiper at position 09 does not electrically engage disc 55. For this reason, it is necessary to have a notch in disc 55 at a point ten spaces removed in a direction opposite to the rotation of the disc from point 09. This requires that a notch be placed in disc 55 at a point corresponding to position 27 as shown in the drawing. Further, when shaft 51 is in position 28, or twenty positions ahead of the position shown in the drawing it will again be necessary to have no current flowing from the "8" terminal of the "units terminals" group into the disc 55, this being at position 09. Therefore, at a position twenty spaces removed from position 09 in the direction opposite to the direction of rotation of disc 55, it is necessary to insert another notch into the disc. It follows that twenty spaces from point 09 in a direction opposite to the direction of rotation brings one to a point corresponding to position 17 as shown in the drawing.

The same teaching as above explained in connection with disc 55 applies to disc 56 which has five wipers associated therewith which in turn are connected to the odd terminals in the "units terminals" group. In the case of disc 56, the first notch is directly in line with the pointer 75. The first notch on disc 55 was not directly in line with its pointer 75, but was one space advanced, due to the fact that the wipers associated with disc 55 were actually one space ahead of the position in question. For example, the "8" terminal of the "units terminals" group was actually connected to a wiper at position 09. Consequently, when shaft 51 was on position 08 it was necessary to have a notch opposite the wiper at position 09 in order to prevent current from flowing into disc 55. However, the wipers associated with disc 55 could have been directly associated with the shaft position and thus the pointer 75 would have been directly in line with the first notch on the disc. It is to be noted that this invention has a minimum number of wipers associated with the "evens" and "odds" discs 55 and 56 respectively. There is only one wiper for each number in the "units terminals" group. Further, it is to be noted that it is only necessary to have one notch in each disc for each successive group of ten and any fraction of a group of ten of the total number of shaft positions. To explain, in a twenty-eight position system there are two full sequences of ten and a partial sequence of eight; consequently, a total of 3 notches are required in each of the evens and odds discs.

*Operation*

In the position shown in the drawing, the system is on position 08 and will remain there until a further shaft position is called for. In accordance to a subsequently selected shaft position, for example, position 29, electrical continuity will be established between the "20" terminal in the "tens terminal" group and its complementary terminal 78 and also between the "9" terminal in the "units terminal" group and its complementary terminal 78. Motor 52 will then be energized, current flowing from terminal 66 of the source of electromotive force 64, through connection lead 72, the complementary terminals 78, the "20" terminal, the wiper at position 25, disc 54, wiper 58, connection lead 63, motor 52, and connection lead 67 to terminal 65 of the source of electromotive force 64. Current also flows from terminal 66 through lead 72, the "9" terminal of the "units terminals" group, to the wiper positioned at position 09 adjacent disc 56, into and through disc 56 to wiper 59, through connection lead 63, motor 52, and connection lead 67 to the other terminal 65 of the source of electromotive force 64. Motor 52, therefore, has in effect two paths of energization, one through the "tens" disc 54 and the other through the "odds" disc 56. Motor 52 consequently will produce step by step rotation of shaft 51 advancing the shaft toward position 29. When the shaft gets to position 20, the energization of motor 52 by virtue of the current flowing through the tens disc 54 will be terminated since the wiper at position 25 no longer is in electrical engagement with disc 54. However, motor 52 will remain energized due to the current flowing through the "odds" disc 56 and thus will continue to advance shaft 51 towards position 29. When shaft 51 gets to position 29 the wiper at position 09 adjacent disc 56 is in electrical disengagement with disc 56 and consequently motor 52 will no longer remain energized by virtue of the current flowing through disc 56. Shaft 51 will remain in position 29, then, until a further shaft position is selected.

As indicated above, discs 54 and 55 are at the same electrical potential, they being electrically connected to one another. The purpose of this is to provide a means of electrically connecting disc 55 to terminal 61 of motor 52. Thus, when shaft 51 is to be moved to a position represented by an even number, for example, position 12, the following circuits would be established. A first circuit would be established and current would flow from terminal 66 through lead 72, the complementary terminal 78 opposite the "10" terminal in the "tens terminal" group 76, the "10" terminal to the wiper at position 15 of disc 54, disc 54, wiper 58, lead 63, motor 52 and lead 67 to terminal 65 of the source of electromotive force 64. A second circuit would be established and current would flow from terminal 66 through lead 72, the complementary terminal 78, opposite the "2" terminal in the "units terminals" group 77, the "2" terminal to the wiper at position 13 of disc 55, disc 55, wiper 70, lead 71, wiper 69, disc 54, wiper 58, lead 63, motor 52 and lead 67 to terminal 65 of the source of electromotive force 64.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of the invention.

What I claim is:

1. Apparatus of the class described comprising a shaft rotatable about its longitudinal axis to any selected one of a plurality of angular positions serially identified by successive whole numbers having two figures; motor means adapted when energized to rotate said shaft; shaft position determining means comprising at least two tens terminals, one of said tens terminals being for each group of said numbers having the same first figure, a plurality of units terminals, a first, second, and third electrically conductive disc mounted for rotation unitarily with said shaft, said first disc having a notch extending a substantial distance around the periphery thereof, said second and third discs having not more than one peripheral notch for each successive group of ten and any fraction of a group of ten of said successive whole numbers, contacting means positioned peripherally about said discs for normally electrically engaging said discs and for electrically disengaging said discs when said notches oppose said contacting means, means electrically connecting said tens terminals to the contacting means associated with said first disc, means electrically connecting said units terminals to the contacting means associated with said second and third discs; terminal means adapted to be energized by an electromotive force; and means including additional connection means for energizing said motor means from said last named terminal means through said contacting means, said discs, and through a selected one of said tens terminals and through a selected one of said units terminals so that said motor means is energized and rotates said shaft until the contacting means connected with said one of said tens terminals and said one of said units terminals are electrically disengaging said discs, said selected one of said tens terminals being determined by the first figure of any selected one of said numbers and said selected one of said units terminals being determined by the second figure of said selected one of said numbers.

2. Apparatus of the class described comprising a shaft rotatable about its longitudinal axis to any selected one of a plurality of angular positions serially identified by successive whole numbers having two figures; motor means adapted when energized to rotate said shaft; shaft position determining means comprising at least two tens terminals, one of said tens terminals being for each group of said numbers having the same first figure, a plurality of units terminals, a plurality of electrically conductive discs mounted for rotation unitarily with said shaft, one of said discs having a notch extending a substantial distance around the periphery thereof, the other of said discs having not more than one peripheral notch for each successive group of ten and any fraction of a group of ten of said successive whole numbers, contacting means positioned peripherally about said discs for normally electrically engaging said discs and for electrically disengaging said discs when said notches oppose said contacting means, means electrically connecting said tens terminals to the contacting means associated with said one of said discs, and means electrically connecting said units terminals to the contacting means associated with said other of said discs; terminal means adapted to be energized by an electromotive force; and means including additional connection means for energizing said motor means from said last named terminal means through said contacting means, said discs, and through a selected one of said tens terminals and through a selected one of said units terminals so that said motor means is energized and rotates said shaft until the contacting means connected with said one of said tens terminals and said one of said units terminals are electrically disengaging said discs, said selected one of said tens terminals being determined by the first figure of any selected one of said numbers and said selected one of said units terminals being determined by the second figure of said selected one of said numbers.

3. Apparatus of the class described comprising a shaft rotatable about its longitudinal axis to any selected one of a plurality of angular positions serially identified by successive whole numbers having two figures; motor means adapted when energized to rotate said shaft; shaft position determining means comprising at least two tens terminals, one of said tens terminals being for each group of said numbers having the same first figure, a plurality of units terminals comprising even and odd terminals, a first, second, and third electrically conductive disc mounted for rotation unitarily with said shaft, said first disc having a notch extending a substantial distance around the periphery thereof, said second and third discs having not more than one peripheral notch for each successive group of ten and any fraction of a group of ten of said successive whole numbers, contacting means positioned peripherally about said discs for normally electrically engaging said discs and for electrically disengaging said discs when said notches oppose said contacting means, means electrically connecting said tens terminals to the contacting means associated with said first disc, means electrically connecting said even terminals to the contacting means associated with said second discs, and means electrically connecting said odd terminals to the contacting means associated with said third disc; terminal means adapted to be energized by an electromotive force; and means including additional connection means for energizing said motor means from said last named terminal means through said contacting means, said discs, and through a selected one of said tens terminals and through a selected one of said unit terminals so that said motor means is energized and rotates said shaft until the contacting means connected with said one of said tens terminals and said one of said units terminals are electrically disengaging said discs, said selected one of said tens terminals being determined by the first figure of any selected one of said numbers and said selected one of said units terminals being determined by the second figure of said selected one of said numbers.

4. Apparatus of the class described comprising a shaft rotatable about its longitudinal axis to any selected one of a plurality of angular positions serially identified by successive whole numbers having two figures; motor means adapted when energized to rotate said shaft; shaft position determining means comprising at least two tens terminals, one of said tens terminals being for each group of said numbers having the same first figure, a plurality of units terminals, a plurality of electrically conductive members mounted for rotation unitarily with said shaft, said members having not more than one peripheral notch for each successive group of ten and any fraction of a group of ten of said successive whole numbers, contacting means positioned peripherally about said members for normally electrically engaging said members and for electrically disengaging said members when said notches oppose said contacting means, means electrically connecting said tens terminals to the contacting means associated with one of said members, means electrically connecting said units terminals to the contacting means associated with the other of said members; terminal means adapted to be energized by an electromotive force; and means including additional connection means for energizing said motor means from said last named terminal means through said contacting means, said members, and through a selected one of said tens terminals and through a selected one of said unit terminals so that said motor means is energized and rotates said shaft until the contacting means connected with said one of said tens terminals and said one of said units terminals are electrically disengaging said members, said selected one of said tens terminals being determined by the first figure of any selected one of said numbers and said selected one of said units terminals being determined by the second figure of said selected one of said numbers.

5. Apparatus of the class described comprising a shaft rotatable about its longitudinal axis to any selected one of a plurality of angular positions serially identified by successive whole numbers having two figures; motor means adapted when energized to rotate said shaft; shaft position determining means comprising at least two tens terminals, one of said tens terminals being for each group of said numbers having the same first figure, a plurality of units terminals, comprising even and odd terminals, a first, second, and third electrically conductive member mounted for rotation unitarily with said shaft, said members having not more than one peripheral notch for each successive group of ten and any fraction of a group of ten of said successive whole numbers, contacting means positioned peripherally about said members for normally electrically engaging said members and for electrically disengaging said members when said notches oppose said contacting means, means electrically connecting said tens terminals to the contacting means associated with said first member, means electrically connecting said units terminals to the contacting means associated with said second member, means electrically connecting said odd terminals to the contacting means associated with said third member, terminal means adapted to be energized by an electromotive force; and means including additional connection means for energizing said motor means from said last named terminal means through said contacting means, said members, and through a selected one of said tens terminals and through a selected one of said unit terminals so that said motor means is energized and rotates said shaft until the contacting means connected with said one of said tens terminals and said one of said units terminals are electrically disengaging said members, said selected one of said tens terminals being determined by the first figure of any selected one of said numbers and said selected one of said units terminals being determined by the second figure of said selected one of said numbers.

References Cited in the file of this patent

UNITED STATES PATENTS

| | | |
|---|---|---|
| 2,406,848 | Novak | Sept. 3, 1946 |
| 2,436,172 | Kent | Feb. 17, 1948 |
| 2,467,422 | Bruene | Apr. 19, 1949 |
| 2,474,576 | Fedotoff | June 28, 1949 |
| 2,553,069 | Unk et al. | May 15, 1951 |
| 2,662,998 | Witters | Dec. 15, 1953 |